June 20, 1967 J. C. RAPEAN ET AL 3,326,858
PROCESS FOR RECOVERING AND DRYING ALDEHYDE POLYMERS
Filed Dec. 30, 1963 2 Sheets-Sheet 1
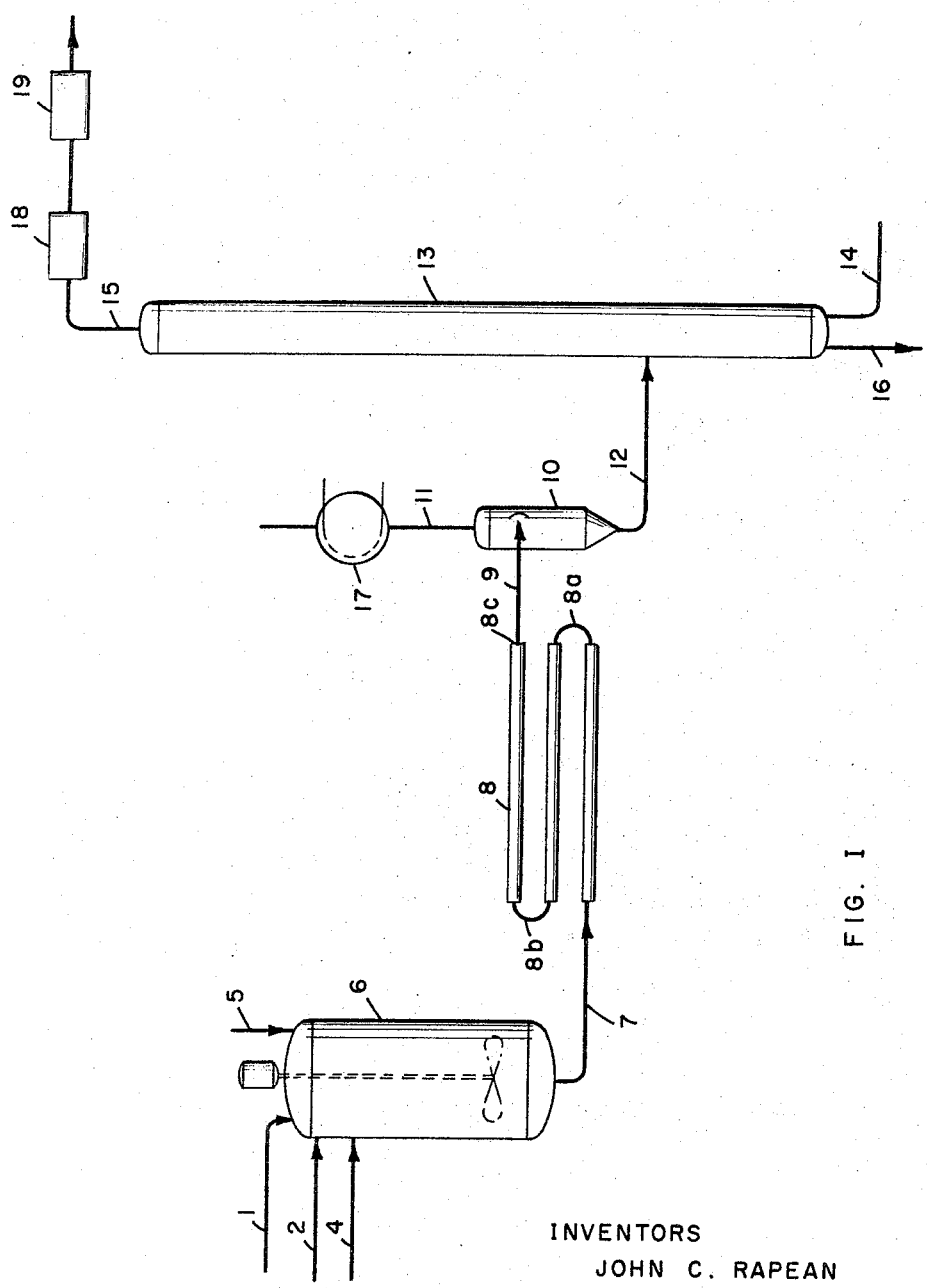
FIG. I
INVENTORS
JOHN C. RAPEAN
RONALD T. CAMBIO
BY
THEIR AGENT

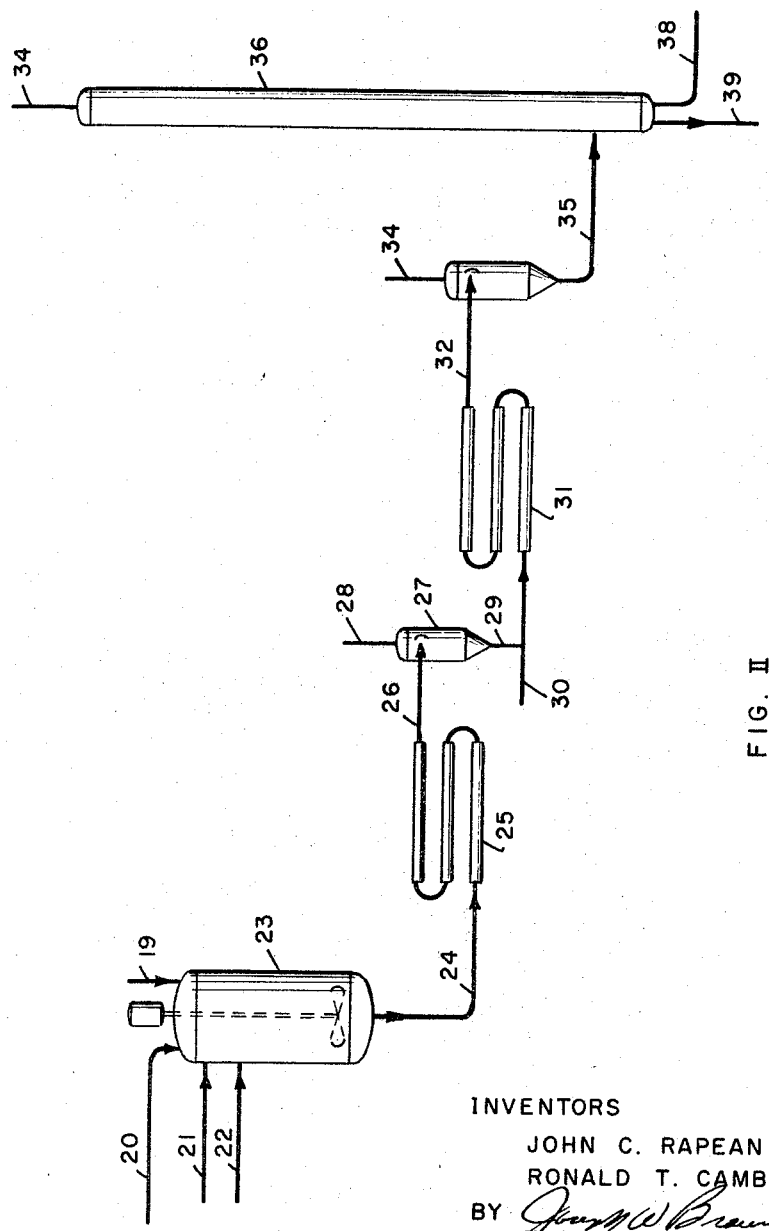
FIG. II
INVENTORS
JOHN C. RAPEAN
RONALD T. CAMBIO
BY
THEIR AGENT

United States Patent Office 3,326,858
Patented June 20, 1967

3,326,858
PROCESS FOR RECOVERING AND DRYING
ALDEHYDE POLYMERS
John C. Rapean, Pleasant Hill, and Ronald T. Cambio,
East Richmond Heights, Calif., assignors to Shell Oil
Company, New York, N.Y., a corporation of Delaware
Filed Dec. 30, 1963, Ser. No. 334,383
9 Claims. (Cl. 260—67)

This invention relates to a process for recovering and drying heat-sensitive aldehyde polymers. More particularly, the invention relates to a process for recovering heat-sensitive aldehyde polymers from aqueous dispersions thereof and converting the polymers to substantially dry finely-divided solid particles.

Specifically, the invention provides a new and highly efficient process for recovering heat-sensitive polymers of alpha,beta-ethylenically unsaturated aldehydes, such as acrolein, from aqueous dispersions thereof, and particularly those resulting from the polymerization of the aldehydes in aqueous systems, and conversion of the polymers to substantially dry finely-divided solid particles which still retain a high degree of reactivity. The process comprises adjusting the pH of the aqueous dispersion containing the aldehyde polymer preferably to a value between 3 and 5, passing the resulting dispersion along an elongated path in a heated zone whereby the liquid component of the dispersion is vaporized and the mixture is converted to a suspension of solid polymer particles in the vapor stream, passing the vaporous suspension into a solid removal device, such as a cyclone vessel, whereby the solid polymer is recovered as a dry powder.

As a special embodiment, the invention provides a continuous process for preparing aldehyde polymers as substantially dry finely-divided solid particles which comprises effecting polymerization of the unsaturated aldehyde in an aqueous medium preferably containing water and a water-immiscible hydrocarbon and a redox polymerization catalyst, removing the aqueous polymer slurry, adjusting the pH of the slurry preferably to about 4, passing the resulting mixture at a moderate velocity into an externally heated conduit in which the liquid component or components is evaporated, passing the resulting suspension of solid polymer particles and taking them to a nitrogen stripper where the final portions of liquid on the particles is removed and the polymer particles are recovered as a very finely-divided powder.

It has recently been found that certain water-insoluble high molecular weight polymers of acrolein having a high aldehyde function can be converted to water-soluble derivatives, such as bisulfite derivatives, which find use as wet strength agents for paper, adhesives, starch insolubilizing agents, tanning of leather and the like. A method for preparing these special acrolein polymers is disclosed in Fischer—U.S. 3,079,357, and in copending patent application Serial No. 859,154, filed December 14, 1959, now U.S. 3,167,529. The resulting polymers, however, are rather unique in that during the aqueous polymerization process, the polymers absorb large quantities of water and form thick heavy pastes or slurries. It has been found that these pastes or slurries are difficult to convert to the desired dry finely divided powders for use in making the water-soluble derivatives.

Attempts have been made in the past to dry the above-noted slurries by conventional techniques, but the results to date have been very discouraging. In some cases, the products still retain large quantities of the water due to the great affinity of the polymer for water molecules, and in others, the conditions employed have converted the heat-sensitive polymers to highly cross-linked materials which were difficult or impossible to dissolve in the bisulfite solutions.

It is an object of the invention, therefore, to provide a new process for recovering of aldehyde polymers from aqueous media. It is a further object to provide a new process for recovering aldehyde polymers from aqueous dispersions thereof and converting the polymer to dry finely-divided particles. It is a further object to provide a new process for recovering aldehyde polymers which does not destroy the aldehyde activity of the polymer. It is a further object to provide a new process for converting polymer slurries to dry substantially dry powders which can be used directly in their intended applications. It is a further object to provide a new process for drying low molecular weight and high molecular weight acrolein polymers without affecting the aldehyde function. These and other objects of the invention will be apparent from the following detailed description thereof and from the attached drawing which illustrates a preferred assembly of apparatus for operating the process of the invention.

It has now been discovered that these and other objects may be accomplished by the process of the invention comprising adjusting the pH of the aqueous dispersion containing the aldehyde polymer preferably to a value between 3 and 5, passing the resulting dispersion along an elongated path in a heated zone whereby the liquid component of the dispersion is vaporized and the mixture is converted to a suspension of solid polymer particles in the vapor stream, passing the vaporous suspension into a solid removal device, such as a cyclone vessel, whereby the solid polymer is recovered as a dry powder. It has been found that by this special technique the aldehyde polymers can be converted to substantially dry finely-divided powders which still have a high degree of activity and can be readily dissolved in aqueous sodium bisulfite or aqueous sulfur dioxide or caustic to form the desired water-soluble derivatives.

The polymers to be recovered by the process of the present invention include the polymers of ethylenically unsaturated aldehydes which have been obtained by addition polymerization through the double bond. The preferred aldehydes to be employed include those having the ethylenic group in an alpha,beta-position relative to the aldehyde group, such as, for example, acrolein, alpha and beta-susbstituted acroleins such as alpha-ethyl-acrolein, alpha - isobutylacrolein, alpha - chloroacrolein, beta-phenylacrolein, alpha-decylacrolein, alpha-cyclohexylacrolein and the like. Particularly preferred aldehydes to be employed in making the polymers include the alpha,beta-monoethylenically unsaturated aldehydes containing from 3 to 12 carbon atoms, and especially acrolein and alpha and beta-substituted acroleins wherein the substituent on the alpha and/or beta-positions is an alkyl, cycloalkyl or aryl group containing no more than 8 carbon atoms. 2-alkenals containing up to 8 carbon atoms come under special consideration.

The molecular weight of the polymers may vary over a considerable range. While the advantages of the invention are particularly in evidence when using the high molecular weight polymers, the process is also useful for the lower molecular weight polymers. Molecular weights may vary for example, from about 5000 up to 2,000,000 or higher as determined by the light scattering technique. The molecular weight range may also be indicated by intrinsic viscosity values as these are usually more easily determined. Such values, as determined at 25° C. using .5 N sodium sulfate and using the water-solubilized (e.g., bisulfite derivative) of the polymer, vary from about 0.01 to about 4.0 dl./g. Preferred polymers are those having intrinsic viscosity values varying from 0.1 dl./g. to about 3.0 dl./g., with particularly preferred polymers having values ranging from about .5 dl./g. to 2.0 dl./g.

The polymers include not only the homopolymers of the unsaturated aldehydes, but also the copolymers of the aldehydes with other ethylenically unsaturated monomers such as those possessing at least one =C=C= group, and preferably those containing a CH₂=C= group, such as, for example, styrene, alpha-methylstyrene, butadiene, isoprene, methylpentadiene, ethylene, propylene, isobutylene, isooctane, vinyl acetate, vinyl propionate, vinylpyridine, vinylnaphthalene, vinylcyclohexene, acrylonitrile, methacrylonitrile, vinyl chloride, vinylidene chloride, acrylate esters as methyl methacrylate, ethyl acrylate, ethyl methacrylate, butyl acrylate and allylic compounds such as allyl acetate, allyl alcohol, allyl butyrate, allyl benzoate, allyl cyclohexanecarboxylate, allylamine and the like. These additional monomers are preferably employed in minor amounts, and preferably in amounts varying from about .5% to 40%, and preferably 1% to 35%, by weight of the mixture of monomers.

The preferred aldehyde polymers are also those possessing a high theoretical aldehyde function, i.e., when the polymer is subjected to conventional tests for the presence of aldehyde groups (e.g., addition of hydroxylamine hydrochloride and titrated liberated H₂O with Karl Fischer reagent) the results show a high percent, e.g., above 90%, and preferably 95% to 99%, of the theoretical aldehyde groups present as such or in the hydrated form. Many of the preferred polymers have the aldehyde groups present in the hydrated form as

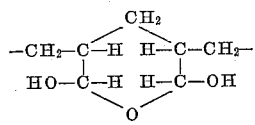

and

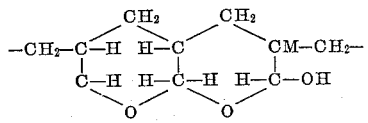

The above-described polymers may be prepared by a variety of different methods. They may be prepared, for example, by heating the unsaturated aldehydes, with a free radical catalyst, such as peroxides as benzoyl peroxide, tertiary butyl hydroperoxide, tertiary butyl perbenzoate, tertiary butyl peracetate and the like, in bulk, emulsion or suspension under controlled conditions.

The above-described polymers will be substantially insoluble in water and when formed in an aqueous medium result in the formation of an aqueous slurry or dispersion. The aqueous slurry or suspension of the polymers used in the process of the present invention can be those obtained directly from the polymerization of the aldehydes in the said aqueous medium, or they can be those created by subsequent treatment of polymers formed in any other suitable method.

Methods for preparing the above-noted polymers in aqueous media are described in Fischer—U.S. 3,079,357, in copending patent application Serial No. 859,154, filed December 14, 1959 now U.S. 3,167,529. And so much of the disclosure of these two patents relative to these polymers and their preparation is incorporated into this application.

A preferred method for making the polymer dispersions useful in the process of the invention comprises effecting polymerization of the aldehyde in a mixture of water and inert water-immiscible organic compound. The inert water-immiscible organic compounds employed are those not reactive with the components in the reaction and which is immiscible with water. Preferred examples include the hydrocarbons which may be aliphatic, cycloaliphatic and aromatic as exemplified by propane, butane, isopentane, pentane, hexane, isohexane, n-heptane, isoheptane, octane, cyclohexane, cyclohexene, benzene, toluene, methylcyclopentane, n-propylcyclopentane, dimethylbenzene and the like. Other inert liquids include the esters, ethers, halides and the like, such as dibutyl ether, diisopropyl ether, diethyl ether, dubutyl ether of ethylene glycol, ethyl acetate, amyl acetate, methyl butanoate, and the like, ethylene dichloride, and mixtures of the foregoing members. Especially preferred are the aliphatic or cycloaliphatic hydrocarbons containing 4 to 18 carbon atoms, and especially no more than 10 carbon atoms. Coming under special consideration are the saturated aliphatic or cycloaliphatic hydrocarbons containing 4 to 8 carbon atoms. The hydrocarbons which are preferably used as the reaction medium comprise the liquid hydrocarbons containing no more than 10 carbon atoms, and still more preferably the aliphatic or cycloaliphatic hydrocarbons as butane, isopentane, n-pentane, hexane, isohexane, n-heptane, isoheptane, octane, cyclohexane, cyclohexene, and the like, and mixtures thereof. Especially preferred are the saturated aliphatic or cycloaliphatic hydrocarbons containing 4 to 8 carbon atoms.

The amount of the inert water-immiscible organic compound to be employed in relation to the monomer to be polymerized may vary over a wide range. In general, it is preferred to employ the said organic compound in an amount varying from 10% to 80% by weight of the total reaction mixture with the unsaturated monomer and water making up the test of the mixture. Represented on a parts basis, preferred amount of inert water-immiscible material comprises from about .6 and preferably .8 to about 4 parts of inert water immiscible per part by weight of unsaturated monomer as acrolein initially present. Particularly preferred amounts vary from about 1 to 4 and still more preferably from about 2 to about 3 parts by weight of inert water-immiscible compounds per part of unsaturated monomer initially present.

It has been found that best results, particularly as to high rates of reaction and high molecular weight products, are obtained when the lower amounts of organic compound, e.g., 20% to 40% of the total mixture, are employed, and these come under special consideration.

The amount of water employed may also vary. For best results, the amount of water should preferably not exceed 50% by weight of the reaction mixture with a preferred minimum amount of water being about 0.5% by weight of the reaction mixture. Preferred amounts of water vary from about 0.2 part to about 3.2 parts by weight of water per part of acrolein initially present with particularly preferred amounts varying from about 0.2 to about 2 and still more preferably about 0.3 to about 2 parts per part of acrolein initially present. Coming under special consideration are amounts of water varying from about 0.4 to about 1 part by weight per part of acrolein.

It is important that the water be dispersed in an inert water-immiscible organic compound during the process. This dispersion can be effected and maintained by the use of sufficient agitation. This may be accomplished by the use of stirrers, tumbling of the reactor and the like. When using stirrers, it is preferred to stir at the rate of about 100 to 800 r.p.m.

The dispersion can also be effected and maintained by controlling the proportion in which the aqueous and water-immiscible organic compound are present relative to each other. The water-immiscible compound is preferably employed in substantial excess and the said water-immiscible compound and water are preferably utilized in proportions of at least about 2:1.

It is also preferred to employ emulsifying agents in the reaction meixtures and preferably those of the water-in-oil type. Examples of such agents include, among others oil-soluble cationic, anionic and non-ionic materials having a great variety of different compositions. Preferred ionic type agents include those having a long chain hydrophobic group, such as, for example, alkali metal and nitrogen-base soaps of higher fatty acids, such as potassium and sodium myristate, laurate, palmitate, oleate, stearate, ammonium stearate, etc., as well as the surface active compounds of the cation-active variety, such as salts of long-chain (e.g. 12 to 18 carbon atoms) aliphatic amines and quaternary ammonium bases, such as lauryl amine hydrochloride, stearyl amine hydrochloride, palmityl amine hydrobromide, and the like, and mixtures thereof. Other examples include the sulfates and sulfonates, such as sulfonated Turkey red oil, stearyl-sulfonate, sulfonated fatty esters and amides, sulfonated long-chain hydrocarbons, and the like, and mixtures thereof.

Also preferred are the non-ionic surface active agents, e.g., those which are not salts and would not be subject to ionization if added to water. Examples of these agents include, among others, partial esters of polyhydric alcohols and saturated or unsaturated fatty acids and preferably fatty acids containing at least 12 and preferably from 12 to 18 carbon atoms, and hexitans and hextides such as sorbitan or mannitan monolaurate, monopalmitate, monostearate, monooleate or the monoesters of coconut oil fatty acids and the like products described in U.S. 2,322,820. Other examples of partial esters of this type include the pentaerythritol and mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane dilaurylate, glucose monostearate, sucrose monooleate, polyglycol monooleate, polyglycol monostearate, and the like.

Examples of other suitable non-ionic agents include the hydroxypolyoxyalkylene ethers of the above-described partial esters. Specific examples of this include, among others, the polyethylene glycol ethers of sorbitan or mannitan monolaurate, monopalmitate, monooleate or monostearate. Other examples include the polyethylene glycol ethers or pentaerythritol mono- and dipalmitate, pentaerythritol mono- and distearate, trimethylolpropane distearate, polyglycidyl dilaurate, and the like.

The amount of the emulsifying agent to be employed may vary over a considerable range depending on the amount of water employed, nature of the monomer to be polymerized and the like. In general, the amount of the agent will vary from 0.005 part by weight to about 5 parts by weight of the unsaturated aldehyde. Preferred amounts vary from about .005 to 0.05 part by weight of the unsaturated aldehyde.

The polymerization of the unsaturated aldehydes can be carried out by use of heat, radiation or by the use of free radical polymerization catalysts in catalytic quantities. It is generally preferred to effect the reaction in the presence of a free radical polymerization catalyst. The term "free radical polymerization catalysts" as employed herein, is intended to define compounds which contain —O—O— or —N=N— structural linkages or are capable of forming such linkages by the action of dilute inorganic acids, or which otherwise produce free radicals in situ during the polymerization reaction.

Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, acetyl benzoyl peroxide, cumene hydroperoxide, tetralin hydroperoxide, phenylcyclohexane hydroperoxide, tertiary butylisopropylbenzene hydroperoxide, tertiary butyl peracetate, tertiary butyl perbenzoate, ditertiary butyl perphthalate, ditertiary butyl peradipate, tertiary amyl percarbonate, and the like; ammonium persulfate and alkali metal-persulfates, such as sodium- and potassium persulfates, etc.; alkali metal- and ammonium percarbonates and perborates; alkyl percarbonates, such as isopropyl percarbonate and butyl percarbonate, etc.; azo compounds such as 2,2'-azobisisobutyronitrile, dimethyl 2,2'-azobisisobutyrate, 2,2'-azobis(2,4-dimethylvaleronitrile), 2,2'-azobisisobutyramide, etc.; trialkylborons, such as tributylboron and trioctylboron, etc.; and the like. Particularly preferred free radical yielding catalysts include the peroxides, such as the diaroyl peroxides, tertiary alkyl hydroperoxide, alkyl peresters of percarboxylic acids, and particularly those of the above-noted groups which contain no more than 18 carbon atoms per molecule.

Particularly preferred catalyst system to be employed includes the redox system employing a free radical catalyst and a reducing agent. The free radical catalyst employed may be any of those described above. Any of the known reducing agents may be employed with the above-described free radical yielding catalysts. These include, among others, polyamines, such as tetraethylene pentamine, tertiary amines, such as dimethyl aniline, adducts of sulfur dioxide and aldehydes and ketones, thiosulfates, bisulfites, aqueous sulfur dioxide solutions, adducts of sulfur dioxide and polymeric aldehydes such as produced by the present process and various multivalent metals, i.e., those metals which can change their valence state reversibly, such as, for example, iron, manganese, copper, vanadium, cobalt, nickel, tin silver titanium, etc. When added to the reaction mixture, the metal must be at least in part in a lower valance state, such as, for example, ferrous chloride, silver nitrate, titanium dichloride, cobaltous chloride, ferrous pyrophosphate, potassium ferrocyanide, manganous sulfate, ferrous sulfate, and the like. The anion portion of the metal salt may be of any amount as long as the resulting salt has the necessary solubility in the reaction medium.

The reducing agents, include, by way of illustration, sulfurous acid; alkyl, alkali metal, and ammonium sulfites; alkali metal and ammonium bisulfites; sulfoxylates; alkyl, alkali metal, and ammonium nitriles; copper and iron salts, as well as other lower valence salts of polyvalent metals, and the like. As typical of the reducing agents there can be mentioned, by way of illustration, sodium bisulfite, potassium bisulfite, ammonium bisulfite, sodium sulfite, dibutyl sulfite, sodium formaldehyde sulfoxylate, sodium nitrite, potassium nitrite, ammonium nitrite, amyl nitrite, cuprous sulfate, cupric sulfate, ferrous sulfate, ferric sulfate, ferrous nitrate, ferric nitrate, titanous sulfate, etc., and the like.

Particularly preferred reducing agents include those which release $SO_2$ if heated, such as, for example, the sulfites and bisulfites, aqueous $SO_2$, $SO_2$ adducts and the like.

The concentration of the catalyst can vary over a wide range. The concentration of the free radical catalyst can, for example, vary from about .01% by weight or lower, to about 5% or higher, based on the weight of the unsaturated monomer, and preferably in the range of about .05% to about 2% by weight of monomer. When using a redox system, the free radical catalysts are employed in small amounts, e.g., about 1 to 50% by weight of the total catalyst concentration. In general, the amount of catalyst used will vary from about $1 \times 10^{-6}$ to $2 \times 10^{-2}$ mols per mol of unsaturated monomer being polymerized. Preferred amounts vary from about $4 \times 10^{-3}$ to $1 \times 10^{-4}$ mols per mol of monomer. In general, use of larger amounts of catalyst tend to reduce molecular weight. Accordingly, if one desired to increase molecular weight it is desirable to use smaller amounts of catalyst.

The amount of the reducing agent employed will depend upon the amount of the peroxide catalyst utilized. It is preferred to have at least an equivalent amount of the reducing agent per equivalent amount of peroxide catalyst. With reference to the sulfur dioxide-containing reducing agents, an equivalent amount refers to that amount needed to release 1 mol of sulfur dioxide per mol of the peroxide catalyst. As for the metals, it is preferred to have at least one gram ion of the metal per mol of the peroxide catalyst, and more preferably .5 to 1 gram ion per mol of peroxide.

It is important that the diluent comprised of water be acidic, i.e., a pH of less than 7, and preferably in the range of from about 1.5 to 5. Particularly preferred range varies from about 2 to about 3. The pH can be maintained below 7 by the incorporation in the reaction mixture of a suitable amount of an acid, such as sulfuric acid, hydrochloric acid, phosphoric acid, nitric acid, acetic acid, etc.

The polymerization is also preferably conducted in an inert atmosphere. This may be accomplished by passing inert gases, such as nitrogen, methane, etc., over the reaction mixture or into and through the reaction mixture.

The temperature employed in the process may vary over a considerable range. In general, preferred to use temperatures ranging from about 0° C. or below to about 100° C. Preferred temperatures range from about 30° C. to about 100° C. Lower temperatures which are the reflux temperatures of the hydrocarbon medium are particularly preferred. Isopentane, for example, refluxes about 25° C. and it is preferred to operate at about this temperature when using the isopentane as the reaction medium. In some cases, lower temperatures, e.g., about 0° C. to about 60° C. may be preferred. Thermal polymerization is generally conducted at temperatures of at least 30° C. The temperature is maintained within this range for a period of time sufficient to produce a polymeric product. In addition, the polymerization process of the invention can be carried out under atmospheric, subatmospheric or superatmospheric pressures.

The polymerization period can be varied as desired or necessary. Thus, for example, a polymerization period of from about 30 minutes, or less, to about 100 hours, or more, can be employed depending, for example, upon the temperature, catalyst, catalyst concentration, etc. During this period, agitation sufficient to maintain a dispersion should be applied to the polymerization reaction mixture.

The polymer will form as insoluble white finely-divided particles which will form a fluid to rather viscous dispersion with the aqueous reaction medium. This dispersion may be used directly in the recovery process of the invention or the reaction mixture may be diluted to concentrated as desired.

In the recovery process of the present invention, the first step is to insure that the aqueous dispersion has the proper pH. If the pH is not within the proper range, the desired results will not be obtained and the product will be converted to hard cross-linked unusable polymer particles. With aldehyde homopolymers prepared as noted above, the pH of the dispersion used in the reaction mixture should preferably be between 3 and 5, a pH of 7 may also be used. When operating with certain copolymers, such as acrolein-acrylonitrile copolymers, it is sometimes possible to operate at slightly lower pH, e.g., pH of about 2 to 2.5 without bringing about the undesired cross-linking. The pH may be brought within the desired range by any suitable means, such as addition of basic materials, as NaOH, addition of basic salts and the like. It is also within scope of the invention to adjust the pH prior or during polymerization (such as by use of buffers) so that the resulting slurry will have the correct pH and no further adjustment will be necessary.

The aqueous dispersion having the corrected pH is then passed onto an elongated path in the heated zone. The apparatus used in this phase of the process may be of any structure, but is preferably an externally heated conduit, such as a steam jacketed pipe or series of steam jacketed pipes.

The temperature employed in the heated zone will be above the boiling point of the liquid in the dispersion, i.e., the water and water-immiscible organic compound such as the hydrocarbons, and at least about 10° C. below the softening point of the aldehyde polymer. As the aldehyde polymers generally have melting points of at least 200° C., the temperature should be retained say below about 190° C. Preferred heating temperatures range from about 80° C. to about 150° C., with particularly preferred temperatures ranging from about 90° C. to 100° C. Pressures may be reduced or increased as needed to maintain the desired temperature.

The rate of passage through the heated zone should be at least sufficient to volatilize the liquids in the dispersion. Moderate liquid velocities of about 0.5 to 1.5 ft./sec. are generally preferred.

The product recovered at the end of the heated zone will be a dispersion of the solid polymer particles in the vaporized liquids. This dispersion is then taken to a solid removing device where the solid polymer particles are separated from the vapors. The apparatus fused for this separation can be of any suitable type. Preferred structures include the conventional cyclone vessel, wherein the solids are removed by means of centrifugal force.

The solids recovered from the solid separator will preferably contain about 20–30% liquids. They will appear as dry finely divided powders and can be used in the above-noted intended applications.

They can, for example, be readily dissolved in aqueous sodium bisulfite indicating the freedom from extensive cross-linking. In some cases, it may be more desirable to subject the powder to further purification to obtain a product with even less liquid content. This may be accomplished by feeding the solids recovered from the cyclone separator to a stripping vessel where the particles are contacted with a countercurrent stream of inert gas, such as nitrogen, which removes the residual monomer and any remaining solvent. The product in this case will have a water content of about 5–10%. The stripper used in this case may be of any suitable construction which would permit the introduction of the solid particles, the introduction at the bottom of the inert gas having a temperature say of about 50–100° C. The finely divided polymer particles may be recovered at the bottom of the stripper and the vapors may be subjected to a filter and scrubber and then recycled.

It is also within the scope of the present invention to use a series of heating zone, solid separators and strippers. Thus, in one preferred method of operation the liquid phase of the slurry is vaporized in a jacketed tube heat exchanger, the vapor-solid mixture is introduced into a cyclone where the solids and vapors are separated, the solids and some residual-occluded vapors are picked up in a stream of hot nitrogen and passed through another jacketed tube heat exchanger, the gas-solid mixture is then separated in a second cyclone and the solids are again taken to a fluidized bed nitrogen stripper.

The process of the invention can be operated on a batch, semi-continuous or continuous basis. Recycles can also be employed to return recovered monomer, solvent, water, etc. to the polymerization vessel. When using the fluidized bed stripper, the nitrogen can be filtered, scrubbed and recycled to the bottom of the stripper.

The operation of the process of the invention may be more clearly illustrated by the attached drawings which illustrate preferred assembly of apparatus for accomplishing the process of the invention. These drawings are for illustration only as it will be realized that substantially different forms of equipment may be employed in carrying out the process of the invention.

FIGURE I illustrates a preferred assembly of apparatus involving the use of polymerization reactor, pipeline dryer, cyclone and fluidized bed stripper. In the operation of the process, acrolein is introduced through line 1, isopentane through line 2, water containing surfactant and bisulfite reducing agent through line 4 and peroxide catalyst through line 5 all to reactor 6. The reaction mixture is stirred and maintained at about 25° C. The aqueous slurry containing the polymer is then withdrawn through line 7 and taken to pipeline dryer 8 which is made up of three 20 foot sections of steam-jacketed ½ inch tubing. The steam is introduced at 175° C. with the temperature at 8a being 75° C., 8b of 102° C. and at 99° C. Residence time in the dryer varies from about 50 to 90 sec. The vaporous dispersion of powder coming from the dryer is then taken by line 9 to cyclone separator 10 where the vapors are withdrawn through line 11 and condenser at condenser 17 and the powdered polymer particles withdrawn through line 12 and taken to fluidized bed stripper 13. Nitrogen at a temperature of 50–100° C. is introduced through line 14 at the bottom of the stripper. Nitrogen is withdrawn at the top, filtered at 18 and scrubbed at 19 and recycled and the final dried polymer particles withdrawn through line 16 and bagged.

FIGURE II illustrates a less preferred assembly of apparatus involving a series of pipeline driers and cyclones. In the operation of the process, acrolein is introduced through line 20, hydrocarbon through line 21, water containing surfactant and bisulfite reducing agent through line 22 and the peroxide catalyst through line 19, all to polymerization reactor 23. The reaction mixture is stirred and maintained at about 25° C. The aqueous slurry containing the polymer is then withdrawn and taken through line 24 to pipeline dryer 25. From the pipeline dryer, the vapors containing the dispersed solid particles are taken through line 26 to cyclone dryer 27 where a great part of the vapors are removed through line 28 and the powdered polymer removed through line 29. The powdered polymer is packed up in a stream of hot nitrogen from line 30 and taken to a second pipeline dryer 31 where the remaining liquids are vaporized and the product is converted to a dispersion of polymer particles in vapor of the released liquids. The resulting vaporous dispersion is taken through line 32 to cyclone 33 where the solids are separated from the remaining vapors. The vapors are withdrawn through line 34 and the solid particles taken through line 35 to fluidized bed stripper 36. Nitrogen is introduced through line 38 and withdrawn at the top through line 34. The dry finely divided polymer powder is withdrawn through line 39.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

Example I

This example illustrates the recovery of polyacrolein using as assembly of apparatus as shown in FIGURE I.

The apparatus consisted of a 185 gallon stainless steel polymerization reactor, a pipeline dryer made up of three 20 foot sections of ½ inch steam jacketed tube, a cyclone separator and fluidized bed stripper.

188 pounds of acrolein (94% pure) and 418 pounds of isopentane were introduced into the reactor. 336 grams of tertiary butyl hydroperoxide (69% pure) were also added. To this mixture was programmed over 10 hour period a solution made up of 84.1 lbs. water, 1.4 pounds of a cationic surface active agent made up of cationic long chain fatty amines (12 to 18 carbon atoms), 432 grams of glacial acetic acid, 269 grams of anhydrous $Na_2S_2O_5$ and 88.5 grams of 50% sodium hydroxide. The resulting mixture was kept at 25° C. for the 10 hour period with constant stirring and then for an additional 2 hours of stirring at 25° C. The resulting mixture was a milky slurry of polymer particles having a solids content of about 10%. The pH of the slurry was already about 4 due to the use of the buffer system in the polymerization.

The resulting aqueous slurry was then taken to pipeline dryer as shown in FIGURE I. The temperature at the end of the first section of pipe was 75° C., at the end of the second section 102° C., and at the end of the third section 99° C. The residence time in the dryer was 68 sec. The suspension of the polymer particles in the vapors emerging from the dryer was taken to a cyclone separator maintained at 100° C. The vapors were removed at the top and the polymer particles taken from the bottom into a nitrogen stripper wherein hot nitrogen (50–100° C.) was introduced at the bottom and stripped the remaining acrolein monomer and isopentane from the polymer particles. The product recovered at the bottom of the nitrogen stripper was a white finely divided powder having a water content of 3.7% w. The product was identified as polyacrolein having an intrinsic viscosity of 1.6 dl./g. and a theoretical aldehyde content of about 95%.

The polymer powder prepared above was easily dissolved in aqueous sodium bisulfite to form a bisulfite adduct of polyacrolein. This was accomplished by mixing 13.3 parts of polymer with 100 parts of water containing 10.5 parts anhydrous sodium bisulfite. The mixture was stirred for 2 hours at 90° C. The powder readily dissolved to form a clear solution which was ideally suited for use in treatment of paper as a wet strength additive.

Example II

Example I was repeated with the exception that 20 parts of the acrolein was replaced with acrylonitrile. In this case, the resulting slurry had a pH of about 2 and the mixture could be used in the recovery and drying process with success without adjustment of the pH. The resulting product was a white powdery copolymer of acrolein and acrylonitrile that could be readily dissolved in aqueous sodium bisulfite according to the method demonstrated in Example I.

Other copolymers that can be used include copolymers of acrolein and methyl methacrylate, copolymers of acrolein and butadiene and copolymers of acrolein and acrylic acid.

Example III

This example illustrates the recovery of polyacrolein using an assembly of apparatus as shown in FIGURE II.

The pipeline dryer in this case consisted of two sets of dryers each made up of 3 sections of steam jacketed 2 inch pipe.

188 pounds of acrolein and 418 pounds of isopentane were introduced into the polymerization reactor. 0.8 pound of tertiary butyl hydroperoxide (169% pure) were also added. To this mixture was programmed over 10 hours period a solution made up of 84.1 lbs. water, 1.4 pounds of a cationic surface active agent made up of cationic long chain (12 to 18 carbon atoms) fatty amines, 432 grams of glacial acetic acid, 269 grams of anhydrous $Na_2S_2O_5$ and 88.5 grams of 50% sodium hydroxide. The resulting mixture was kept at 25° C. for the 10 hour period with constant stirring and then for an additional 2 hours of stirring at 25° C. The resulting mixture was a milky slurry of polymer particles having a solids content of about 10%. The pH of the slurry was already about 4 and ready to be used in the dryer.

The resulting slurry was then taken to the first pipeline dryer as shown in FIGURE II. The residence time in the dryer was about 68 sec. The temperature of the vaporous dispersion coming out of the dryer was about 99° C. The vapors were taken to the first cyclone separator maintained at 100° C. The vapors were removed and the resulting powder taken in a stream of hot nitrogen (80° C.) to a second pipeline dryer of the same type and conditions as the first dryer. The vapor stream from this dryer was then taken to a second cyclone separator. The vapors were removed and the powder taken to a nitrogen fluidized bed stripper as in Example I. The resulting product was a white finely divided powder having a water content of 5% w. The product was identified as polyacrolein having an intrinsic viscosity of 1.3 dl./g. and a theoretical aldehyde content of about 95%.

The polymer powder prepared above was easily dissolved in aqueous sodium bisulfite to form a bisulfite adduct of polyacrolein. This was accomplished by mixing 13 parts of polymer with 100 parts of water containing 6 parts anhydrous sodium bisulfite. The mixture was stirred at 90° C. The powder readily dissolved to form a clear solution which was suited for use in treating paper as a wet strength additive.

Example IV

This example illustrates the use of the process for recovering a polymer of low molecular weight prepared in a water-acetone mixture.

508 parts of acetone were combined with 197 parts of acrolein. To this mixture over a period of 12 hours was added a water solution made up of 56 parts of a 3.83% solution of sulfur dioxide in acetone and 104.4 parts of water, and a soluution made up of 27 parts acetone, 15.8 parts allyl alcohol, and 18.3 parts t-buty-hydroperoxide (69% pure). The pH of the solution was about 2. The mixture was stirred and kept under nitrogen at 20-25° C. for 12 hours. At the conclusion of the reaction, the mixture was a milky looking slurry of polymer particles (10% solids).

The above slurry was brought to pH 4 and then taken to a pipeline dryer as shown in FIGURE I. The average temperature in the dryer was 175° C. The residence time in the dryer was 68 sec. The suspension of the polymer particles in the vapors emerging from the dryer was taken to a cyclone separator maintained at 100° C. The vapors were removed at the top of the polymer particles taken from the bottom into a nitrogen stripper wherein hot nitrogen (50-100° C.) was introduced at the bottom and stripped the remaining acrolein monomer and acetone from the polymer particles. The product recovered at the bottom of the nitrogen stripper was a white finely divided powder having a water content of 24% w. The product was identified as polyacrolein having an intrinsic viscosity of 0.15 dl./g. and a theoretical aldehyde content of about 95%.

The above polymer could be readily dissolved in aqueous sodium bisulfite by the method shown in Example I.

Example V

Example I is repeated with the exception that the isopentane is replaced with heptane, butane (using about 2½ atmospheres pressure) and propane (using about 8–9 atmospheres). Related results are obtained.

We claim as our invention.

1. A method for recovering solid water-insoluble polymers of alpha,beta-ethylenically unsaturated aldehydes which polymers have a molecular weight of 5000 to 2,000,000 as determined by the light scattering technique and are dispersed in an aqueous medium and form a thick paste or milky slurry therewith which comprises adjusting the pH of the aqueous dispersion, passing the resulting dispersion along an elongated path in a heating zone whereby the liquid component of the slurry is vaporized and the mixture is converted to a suspension of polymer particles in the vapor stream, passing the vaporous suspension into a solid removal device whereby the solid polymer is recovered as a dry powder.

2. A process for recovering solid water-insoluble polymers of acrolein which polymers have a molecular weight between 5000 and 2,000,000 as determined by the light scattering technique and are dispersed in an aqueous medium and form a thick paste or milky slurry therewith, which comprises adjusting the pH of the aqueous dispersion to between about 3 and 5, passing the resulting dispersion along an elongated path in a heating zone maintained at a temperature above the boiling point of the liquid in the dispersion and at least about 20° F. below the softening point of the acrolein polymer, whereby the liquid component of the slurry is vaporized and the mixture is converted to a suspension of the acrolein polymer particles in the vapor stream, passing the vaporous suspension into a solid removal device whereby the solid polymer is recovered as a dry powder.

3. A process for recovering solid water-insoluble polymers of acrolein which polymers have a molecular weight between 5000 and 2,000,000 as determined by the light scattering technique and are dispersed in an aqueous medium and form a thick paste or milky slurry therewith containing water and a water-insoluble organic compound and having a pH of about 3 to 5 which comprises passing the resulting aqueous dispersion into an elongated externally heated conduit maintained at a temperature above the boiling point of the said water and water-insoluble organic compound and below the melting point of the acrolein polymer, whereby the liquid components of the slurry are vaporized and the mixture is converted to a suspension of the polymer particles in the vapor stream, passing the vaporous suspension into a cyclone vessel and recovering substantially dry powdered solid acrolein polymers from the cyclone.

4. A process as in claim 3 wherein the water-insoluble organic compound is isopentane.

5. A process as in claim 3 wherein the temperature of the conduit varies from about 70° C. to 110° C. and the pressure is such as to effect the vaporization of the liquid components.

6. A process as in claim 3 wherein the polymer is a copolymer of acrolein and a dissimilar monomer containing a $CH_2=C$ group.

7. A process for recovering water-insoluble polyacrolein particles having a molecular weight between 5000 and 2,000,000 as determined by the light scattering technique and dispersed in an aqueous medium containing water and a water-insoluble inert hydrocarbon boiling below 212° F. and form a thick paste or milky slurry therewith, which comprises adjusting the pH of the dispersion to between 3 and 5, passing the resulting dispersion into an elongated externally heated conduit maintained at a temperature of about 100° C. to about 110° C., whereby the liquid components of the slurry are vaporized and the mixture is converted to a suspension of the polymer particles in the vapor stream, passing the vaporous suspension into a cyclone vessel, withdrawing the vaporous stream from the cyclone, condensing it and returning the liquid to the polymerization zone, and recovering from said cyclone substantially dry solid powdered polyacrolein.

8. A process for recovering solid water-insoluble polyacrolein particles having a molecular weight between 5000 and 2,000,000 as determined by the light scattering technique and are prepared in water-hydrocarbon dispersion wherein the polymer particles form a thick paste or milky slurry with said dispersion from the said dispersion, which comprises adjusting the pH of the dispersion to about 4, passing the resulting dispersion into an elongated externally heated conduit the skin temperature of which is about 110° C., whereby the liquid components of the dispersion are vaporized and the mixture is converted to a suspension of the polymer particles in the vapor stream, passing the vaporous suspension into a cyclone vessel, withdrawing the vaporous stream from the cyclone, condensing it and returning it to the polymerization zone, recovering the solid polymer particles from the cyclone and taking them to a stripper where they come in contact with a stream of inert gas to remove any residual monomer or hydrocarbon, and then recovering the substantially dry solid polyacrolein.

9. A process as in claim 8 wherein the hydrocarbon is an aliphatic hydrocarbon containing 3 to 7 carbon atoms.

References Cited

UNITED STATES PATENTS

| | | | |
|---|---|---|---|
| 2,212,894 | 8/1940 | Allen | 260—67 |
| 2,379,711 | 7/1945 | Hemminger | 196—52 |
| 2,755,324 | 7/1956 | Mueller | 260—683.15 |
| 2,967,855 | 1/1961 | Lang | 260—80.5 |

WILLIAM H. SHORT, *Primary Examiner.*

SAMUEL BLECH, L. M. PHYNES,
*Assistant Examiners.*